United States Patent
Bullus

(10) Patent No.: US 9,732,207 B2
(45) Date of Patent: Aug. 15, 2017

(54) COMPOSITION COMPRISING CHEWING GUM, METHOD FOR PRODUCING THE SAME AND USE THEREOF

(71) Applicant: Anna Louise Bullus, Rogate (GB)

(72) Inventor: Anna Louise Bullus, Rogate (GB)

(*) Notice: Subject to any disclaimer, the term of this patent is extended or adjusted under 35 U.S.C. 154(b) by 127 days.

(21) Appl. No.: 14/581,210

(22) Filed: Dec. 23, 2014

(65) Prior Publication Data

US 2015/0111999 A1 Apr. 23, 2015

Related U.S. Application Data

(62) Division of application No. 13/125,525, filed as application No. PCT/GB2009/002542 on Oct. 23, 2009, now abandoned.

(30) Foreign Application Priority Data

Oct. 24, 2008 (GB) .............................. GB0819542.2

(51) Int. Cl.

| | |
|---|---|
| C08L 23/06 | (2006.01) |
| A23G 4/06 | (2006.01) |
| A23G 4/08 | (2006.01) |
| A23G 4/20 | (2006.01) |
| A23G 4/02 | (2006.01) |
| C08K 3/30 | (2006.01) |
| C08K 3/34 | (2006.01) |
| C08L 5/00 | (2006.01) |
| C08L 9/00 | (2006.01) |

(52) U.S. Cl.
CPC .............. *C08L 23/06* (2013.01); *A23G 4/02* (2013.01); *A23G 4/064* (2013.01); *A23G 4/08* (2013.01); *A23G 4/20* (2013.01); *C08K 3/30* (2013.01); *C08K 3/34* (2013.01); *C08L 5/00* (2013.01); *C08L 9/00* (2013.01); *C08K 2003/3045* (2013.01); *C08L 2207/20* (2013.01)

(58) Field of Classification Search
CPC . A23G 4/02; A23G 4/064; A23G 4/08; A23G 4/20; C08K 3/30; C08K 3/34; C08K 2003/3045; C08L 23/06; C08L 5/00; C08L 9/00; C08L 2207/20
USPC ..... 521/40–49.8; 426/3, 6; 524/55, 423, 451
See application file for complete search history.

(56) References Cited

U.S. PATENT DOCUMENTS

| | | | |
|---|---|---|---|
| 4,013,616 A | 3/1977 | Wallace | |
| 4,352,822 A | 10/1982 | Cherukuri et al. | |
| 4,459,311 A | 7/1984 | DeTora et al. | |
| 4,518,615 A | 5/1985 | Cherukuri et al. | |
| 2004/0209082 A1 | 10/2004 | Lee et al. | |
| 2005/0140041 A1 | 6/2005 | Seth | |
| 2005/0238759 A1 | 10/2005 | Yoon et al. | |
| 2007/0160707 A1 | 7/2007 | Garcia | |

FOREIGN PATENT DOCUMENTS

| | | |
|---|---|---|
| EP | 0763331 A | 3/1997 |
| GB | 2046568 A | 11/1980 |
| WO | 9633623 A | 10/1996 |
| WO | 02069729 A | 9/2002 |
| WO | 2008037252 A1 | 4/2008 |

OTHER PUBLICATIONS

"Recycling Chewing Gum", http://www.moreinspiration.com/article/1889/recycling-chewing-gum?p=similar%20components &t=materials , Oct. 22, 2007.*
International Search Report of PCT/GB2009/002542 mailed Mar. 9, 2010, 4 pages.
Written Opinion of the International Searching Authority of PCT/GB2009/002542 mailed Mar. 9, 2010, 7 pages.
International Preliminary Report on Patentability of PCT/GB2009/002542 mailed Apr. 26, 2011, 7 pages.
Chewing Gum Litter, Postnote, Sep. 2003, pp. 1-2, No. 201, Parliamentary Office of Science and Technology.
Combined Search and Examination Report under Section 17 and 18(3), GB App. No. 0819542.2, mailed Apr. 30, 2009, 8 pages.
File history of related U.S. Appl. No. 13/125,525, filed May 6, 2011, 487 pages.

* cited by examiner

*Primary Examiner* — Frances Tischler
(74) *Attorney, Agent, or Firm* — Jason Saunders; Arnold, Knobloch & Saunders, L.L.P.

(57) ABSTRACT

A composition comprising used chewing gum and a filler is provided, together with a method of preparing the same. In a preferred method, the chewing gum is subjected to a pre-treatment with an oil or water before being combined with the filler. In an alternative method, the chewing gum is used alone with the filler. A composition comprising used chewing gum, a filler and a polymer is also provided, together with a method of its preparation, in which a pre-mixture of the gum and filler is first prepared, before being combined with the polymer, preferably in a molding process. Articles prepared from a composition of used chewing gum, a filler and a polymer are also disclosed.

17 Claims, No Drawings

COMPOSITION COMPRISING CHEWING GUM, METHOD FOR PRODUCING THE SAME AND USE THEREOF

The present invention relates to a composition comprising chewing gum, in particular used or chewed chewing gum, a method for its preparation and its use.

Chewing gum is consumed in large quantities. However, the nature of chewing gum and its use results in the gum generally being discarded by the user after use. In principle, the user should dispose of the used chewing gum in a proper manner. However, this frequently does not happen and the used chewing gum is discarded improperly, for example being thrown onto the pavement or floor. This is a growing problem in many towns and cities around the world. The issues surrounding this problem and removing discarded chewing gum are discussed, for example, in Postnote 201, September 2003, of the UK Parliamentary Office of Science and Technology, entitled 'Chewing Gum Litter'. Many of the problems of discarded chewing gum arise from the very adhesive properties of the gum once chewed. One approach to address the problem of discarded chewing gum is to develop a chewing gum composition that, once chewed, has a lower adhesion to surfaces, such as pavements, flooring, shoes and the like. Accordingly, significant research has been conducted into the development of so-called 'non-sticky' chewing gums. However, altering the adhesive properties of used chewing gum requires modifications to the gum base, an essential part of the gum composition, which in turn may adversely affect its properties as a gum for chewing.

An alternative proposal to promote the proper disposal of used chewing gum is to encourage the user to recycle the gum. However, for this approach to be effective on a scale sufficient to address the problem of discarded chewing gum, a use for the recycled gum is required. Currently, there are no end uses for recycled chewing gum, once collected.

Many patent documents relating to the formulation of a chewing gum formulation have been published. Examples include U.S. Pat. No. 4,518,615; US 2005/238759; US 2007/286927; WO 2008/037252; GB 2,046,568; and U.S. Pat. No. 4,459,311. None of these documents relates to the processing or use of the chewing gum once it has been chewed and used.

Experiments have been conducted into combining used chewing gum with a polymer, which may be then be used to form a range of plastic articles. However, it has been found that the direct combination of the chewing gum with the polymer is not feasible and the two components cannot be readily combined directly. A method has now been found to allow chewing gum to be combined with one or more polymers, in turn allowing a range of plastic articles to be formed in known manner. The method is particularly suitable for recycling used chewing gum and preparing a wide range of products.

In a first aspect, the method relies upon combining the used chewing gum with a filler, so as to form a composition that may be divided, for example finely divided to form crumbs or a powder.

Accordingly, a first aspect of the present invention provides a method for preparing a chewing gum composition, the method comprising the step of:
combining the chewing gum with a filler.

In a related aspect, the present invention provides a composition comprising chewing gum and a filler.

As discussed above, the present invention is concerned with providing a means for utilising chewing gum once it has been chewed and used by the consumer. Accordingly, references to 'chewing gum' in relation to the present invention are therefore to chewing gum after it has been chewed and used. Chewing gum is generally formed from a water insoluble phase, known in the art as 'gum base', and a water soluble phase. The gum base comprises as a major component one or more of a natural latex, such as chicle, or a synthetic rubber, such as isobutylene and butadiene rubbers. Additional components that may be present in the gum base include resins, waxes, plasticisers, emulsifiers, fillers and antioxidants. The gum base may comprise up to 30% or more of the fresh chewing gum.

The water soluble phase may contain a number of components, such as sweeteners, flavourings and colouring agents.

During chewing, the composition of the gum is changed. For example, components in the water soluble phase are removed from the gum. In addition, components present in the saliva of the consumer are added to the chewing gum as a result of the chewing action. Accordingly, the properties of the used chewing gum can differ markedly from the fresh or unused gum, due to the extensive mechanical action of chewing and the exchange of components between the gum and saliva in the mouth of the consumer. The precise properties of the chewed gum will depend upon the time and nature of the mastication of the gum. Further, the properties of the chewed gum can vary over time, for example due to exposure to air and/or heat after disposal.

The term 'chewing gum' as used herein is a reference to any product comprising a gum base that is chewed by the consumer and includes chewing gums, bubble gums and the like.

As noted above, the present invention is particularly advantageous for the use and processing of used chewing gum, that is gum that has been chewed. The used is preferably sterilised before being used. Any suitable technique for sterilising the gum may be employed. Heating the gum is a particularly convenient and effective means of sterilisation. The gum may be heated to a temperature of up to 250° C., more preferably up to 220° C., to perform the sterilisation. The heating may be carried out in an oven or autoclave, or other suitable heating apparatus. If the further processing of the chewing gum includes heating, as may be the case in certain embodiments of the present invention, as discussed hereinbelow, the sterilisation step may be omitted.

The chewing gum is combined with a filler to form the composition. Any suitable filler may be used and suitable fillers include natural and synthetic fillers. Preferred fillers are finely divided or powdered minerals, such as clays and silicas. Examples of suitable fillers are carbonates, sulphates, oxides, hydroxides and silicates of metals, such as alkaline earth metals, in particular calcium and magnesium. In one preferred embodiment, the filler is a talc, that is a magnesium silicate. In an alternative preferred embodiment, the filler is calcium sulphate. Chalk is also a very suitable filler. The filler may consist of a single component or alternatively may comprise a mixture of two or more of the aforementioned materials.

The composition may comprise any suitable amount of the filler, sufficient to allow the composition to be divided, such as crumbed or powdered, and suitable for further processing and use. The amount of filler required will depend upon such factors as the properties of the used chewing gum and the requirements of the further processing. The amount of filler will also depend upon the nature of any pre-treatment applied to the chewing gum, such as the use of an oil pre-treatment, as described hereinbelow. The filler may be present in an amount, for example, up to 80% by weight of the composition, more preferably up to 75% by weight of the composition. The lower limit of the amount of filler present is preferably at least 2% by weight, more preferably at least 5% by weight, still more preferably at least 10% by weight. Preferably, the composition comprises filler in an amount in the range of from 2 to 80% by weight, more preferably from 5 to 75% be weight, still more preferably from 10 to 70% by weight.

The filler may be combined with the chewing gum in any suitable manner. In one embodiment, the gum and filler are simply combined by mixing with agitation, such as kneading, stirring and the like. In such a case, it may be necessary to cut or slice the gum, depending upon its properties, in particular its hardness. In an alternative technique, the chewing gum and filler are combined by being fed together to pass between rollers, thereby mixing the gum and the filler. The resulting mixture may then be divided into strips or particles by cutting in a known manner.

The mixing may be conducted at ambient temperature. Alternatively, the components may be heated while the mixing is taking place. Heating may assist in softening the chewing gum, allowing mixing of the gum and filler to take place more easily and quickly. If heat is applied, the mixture should be heated to a temperature below that at which the gum begins to degrade. The mixture may be heated to a temperature of up to 250° C., more preferably up to 200° C. Preferably, the temperature is below 170° C., more preferably below 150° C. Preferred temperatures are in the range of from 50 to 150° C., with temperatures in the range of from 100 to 120° C. being particularly preferred. Heating may be carried out in any suitable apparatus, for example an oven or autoclave.

In one embodiment, the chewing gum is treated with an oil prior to being combined with the filler. The oil may be any suitable oil, including both organic and synthetic oils. Vegetable oils are particularly suitable. Preferred vegetable oils include rape seed oil and sunflower oil. Alternative oils include mineral oils.

A preferred oil treatment comprises contacting the chewing gum with the oil in large excess, for example by immersion in the oil. The chewing gum may be contacted with the oil at ambient conditions. However, the gum is preferably contacted with the oil at elevated temperatures. Any suitable means for heating the oil and gum may be employed, most preferably indirect heating, for example by means of an oven or autoclave. Irradiation with microwaves is also a convenient method of heating the mixture. The maximum operating temperature will be determined by the properties of the gum and oil and should be below the temperature at which either component will degrade. Preferred temperatures are in the range of from 40 to 250° C., more preferably from 50 to 200° C., more preferably from 75 to 150° C. Temperatures in the range of from 100 to 120° C. have been found to be particularly suitable.

The chewing gum is preferably contacted with the oil with agitation, for example stirring.

Once the chewing gum and oil have been contacted, the resulting mixture will separate into two readily identifiable liquid fractions or phases, one that is rich in the chewing gum and one that contains substantially no gum. The phases or fractions are separated, for example by decanting the lighter oil phase or fraction from the heavier gum-containing phase or fraction. The oil thus recovered may be recycled and reused in the processing of further gum. The liquid chewing gum phase or fraction is then combined with a filler, as described hereinbefore.

In an alternative embodiment, the chewing gum is combined with an oil and the mixture heated. The mixture may be heated by any suitable means, in particular in an oven or autoclave. The oil is present in this embodiment in an amount sufficient to form a highly viscous liquid or paste. The resulting mixture is then combined with a filler, as hereinbefore described. The oil may be any of the oils described as being suitable hereinbefore. The oil and chewing gum may be present in any suitable ratio to provide the paste, for example in a ratio of from 0.5:1.0 to 5.0:1.0, more preferably from 1:1 to 3:1. Water may be used in place of the oil.

In a further alternative embodiment, the chewing gum is heated, preferably in a finely divided form, and the heated chewing gum combined directly with the filler. The use of oil or water, in particular oil, modifies the properties of the chewing gum, which may improve the handling of the chewing gum, for example making it more flexible. This in turn may improve the ease of formulating the gum in the composition.

The chewing gum/filler composition is prepared so as to be able to be divided, such as to be formed into pellets or crumbs, or finely divided into a powder. Suitable techniques for forming the composition into crumbs, pellets or a powder are known in the art. To form pellets, the composition may be combined with a polymer. The mixture may then be formed into pellets in known manner, for example by extrusion and cutting. Any suitable polymer may be combined with the composition. Examples of suitable polymers include polyolefins, such as polyethylene and polypropylene. Alternatively, the polymer may be a so-called 'bioplastic', that is a polymer prepared from organic components derived from biomass. Such bioplastics and bioresins are known in the art and commercially available. Other suitable polymers will be known and apparent to the person skilled in the art. If the composition is to be used in forming plastic objects and articles from a polymer, the polymer combined with the composition to form the pellets is preferably compatible with, most preferably the same as, the polymer to be used in the later production of the article.

In a further aspect, the present invention provides a method of forming a chewing gum/polymer composition, the method comprising the steps of:

combining the chewing gum with a filler to form a pre-mixture; and combining the pre-mixture thus formed with a polymer.

In a related aspect, the present invention provides a composition comprising chewing gum, a filler, and a polymer.

The chewing gum is combined with the polymer in the form of a pre-mixture comprising the gum and a filler and which may be prepared as described hereinbefore. The pre-mixture and the polymer may be combined in any suitable manner. For example the pre-mixture and polymer may be present in a divided form, for example powder, pellets or crumbs. In a preferred embodiment, both the pre-mixture and the polymer are combined in the form of pellets. The pre-mixture pellets may be prepared as described above. Polymers are typically available commercially in pellet form.

The pre-mixture and polymer may be combined in any suitable amounts or ratios, depending upon the desired composition. Typically, the pre-mixture will be combined with the polymer in a weight ratio of pre-mixture to polymer of from 0.01 to 0.25, preferably from 0.05 to 0.2, more preferably from 0.75 to 0.15.

The pre-mixture and the polymer may be combined in any suitable manner, in particular by mixing with the application of pressure and/or heat. For example, the pre-mixture and polymer may be combined by mixing with both being heated so as to be softened, more particularly in the liquid phase, and then cooled. In one preferred embodiment, the pre-mixture and polymer are both used as raw materials in a process for preparing a finished article or component, the pre-mixture and polymer being combined during the processing. In a particularly preferred embodiment, the pre-mixture and the polymer are both used in a moulding process for the formation of a polymer article, in particular a vacuum, injection or blow-moulding process. Such processes are well known in the art and apparatus for carrying out such processes is well known and commercially available. The pre-mixture and the polymer may be combined prior to being fed to the process, for example by simple mixing or by a process that provides a more intimate mixture of the components, prior to be subjected to the moulding process.

In one embodiment, the components of the pre-mixture, that is the chewing gum and filler, may be combined together with the polymer, for example in the feed hopper of an extrusion apparatus or the like. In this way, the separate preparation of the pre-mixture is avoided.

The chewing gum/polymer composition may comprise other components or additives, as may be required for the end use of the composition. Such components or additives include colouring agents, stabilisers, antioxidants and the like. Suitable additives for inclusion in the composition are those typically applied in the polymer art and are well known to the person skilled in the art and commercially available. The additives may most suitably be incorporated in the composition using a masterbatch, suitable masterbatch products being available commercially.

The additive components may be combined with the pre-mixture, with the polymer or with the chewing gum/polymer composition. For example, the additive components may be combined with the pre-mixture and the polymer by being fed together to the process for preparing the finished article, as mentioned above.

The chewing gum/polymer composition may comprise the chewing gum in any desired amount. The amount of chewing gum present will be determined, in part, by the properties to be possessed by the composition and the properties and use to be made of the articles formed from the composition. In particular, the properties of the composition may vary according to the process to be employed to produce the finished article. For example, the properties of the composition may need to be tailored to a specific moulding process, such as blow moulding, injection moulding rotomoulding, or the like. In general, the chewing gum may be present in the composition in an amount of up to 90% by weight, preferably up to 85% by weight, more preferably up to 75% by weight. Compositions comprising up to 50% by weight of chewing gum may be particularly suitable for many processes. Compositions with high chewing gum contents, for example above 50% by weight, are typically suitable for use in injection moulding processes. However, such high chewing gum contents may not be suitable for blow moulding. Accordingly, embodiments of the composition of the present invention with lower chewing gum contents are also preferred. In particular, the chewing gum may be present in an amount of up to 25% by weight, more preferably up to 15% by weight, with amounts up to 10% by weight being applied in many cases. The composition may contain chewing gum in an amount of from 0.1 to 25% by weight, more preferably from 0.5 to 25% by weight, especially from 1 to 25% by weight.

The pre-mixture of chewing gum and filler may be combined with any suitable polymer. Suitable polymers will be known in the art and are commercially available. Suitable polymers include the polyolefins, such as polyethylene, polypropylene, polybutadiene and the like. Other suitable polymers include styrenic polymers and poly vinyl acetate. Further suitable polymers include polyesters, such as polyethylene terephthalate. Such polymers are all available commercially and their use in preparing a wide range of end products, together with the processing technology and apparatus, will be known to and understood by the person skilled in the art. The polymers selected may be used in a range of densities. For example, the pre-mixture may be combined with high density, medium density and low density polyethylene with similar advantageous effect.

The chewing gum/polymer composition may be used in any suitable process for preparing a finished article. Preferred processes are moulding processes. Suitable moulding processes are well known in the art and include injection moulding, blow moulding, vacuum moulding and rotomoulding (rotational moulding).

In a further aspect, the present invention provides an article prepared by a method as hereinbefore described. The article is preferably prepared by a moulding process, in particular blow moulding, vacuum moulding, rotomoulding or injection moulding.

In addition, the present invention provides an article comprising chewing gum, a filler and a polymer.

It has been found that significant quantities of chewing gum may be incorporated into polymer compositions and used in a large range of processes for the preparation of a wide range of polymer and plastic articles. It is particularly surprising that, using the method of the present invention to first combine the chewing gum with a filler and form a divided composition for combining with the polymer, significant quantities of chewing gum may be used with the polymer without any detrimental effect to the properties of the polymer composition or the finished articles.

Embodiments of the present invention will now be described by way of the following examples, which are presented purely for illustrative purposes.

EXAMPLE 1

Preparation of a Chewing Gum/Filler Composition

A composition containing chewing gum and a filler was prepared as follows:

Masticated chewing gum (Wrigley's Spearmint Extra®) (10 g) was mixed by kneading with plaster (calcium sulphate hemihydrate, 6 g) until homogeneous. The resulting mixture was allowed to stand in air at ambient conditions for several hours. The resulting composition was malleable, with some elasticity, and easy to stretch and tear. The composition was finely divided by cutting into small pieces several millimeters in diameter.

EXAMPLE 2

Preparation of a Chewing Gum/Filler Composition

A composition containing chewing gum and a filler was prepared as follows:

Masticated chewing gum (Wrigley's Spearmint Extra®) (10 g) was mixed by kneading with talc (hydrated magnesium silicate, 8 g). The resulting mixture was allowed to stand overnight in air at ambient conditions. The resulting composition was dry, with little elasticity and was easily divided into crumbs.

EXAMPLE 3

Preparation of a Chewing Gum/Filler Composition

A composition containing chewing gum and a filler was prepared as follows:

Masticated chewing gum (Wrigley's Strawberry Hubba Bubba®) (10 g) was mixed by kneading with talc (hydrated magnesium silicate, 12 g). The resulting mixture was allowed to stand overnight in air at ambient conditions. The resulting composition was malleable, with some elasticity and was easily divided by tearing into pieces having a diameter of a few millimeters.

EXAMPLE 4

Preparation of a Chewing Gum/Filler Composition

A composition containing chewing gum and a filler was prepared as follows:

Masticated chewing gum (Wrigley's Spearmint Extra®) (100 g) was added to vegetable oil (100 g) with stirring. The resulting mixture was heated to 120° C. and held at this temperate for 1 hour with occasional stirring. The resulting mixture was allowed to cool, following which two liquid fractions could be identified: a heavier fraction containing the chewing gum; and a lighter fraction containing predominantly vegetable oil. The lighter fraction was decanted off the heavier fraction.

The heavier liquid fraction (75 g) containing the chewing gum was combined with white chalk powder (215 g) with stirring to produce a dry, crumbly composition.

The resulting composition was combined with recycled high density polyethylene (HDPE HYA 600; ex ExxonMobil; 100 g) by simple mixing and the resulting composition fed to the feed hopper of an extruder (single screw extruder, ex. Barbender), where it was heated to 220° C., forced under pressure through a die and cut to form pellets.

EXAMPLE 5

Preparation of a Chewing Gum/Filler Composition

A composition containing chewing gum and a filler was prepared as follows:

Masticated chewing gum (Wrigley's Spearmint Extra®) (100 g) was added to sunflower seed oil (100 g) with stirring. The resulting mixture was heated by placing in a microwave oven (Miele; 800 W) for 3 minutes. Thereafter the resulting mixture was allowed to cool and used to form pellets using the general procedure of Example 4.

EXAMPLE 6

Preparation of a Chewing Gum/Filler Composition

A composition containing chewing gum and a filler was prepared as follows:

Masticated chewing gum (Wrigley's Strawberry Hubba Bubba®) (60 g) was chopped into pieces and mixed with talc (hydrated magnesium silicate, 60 g) to form a mixture with a crumbly appearance and texture. The resulting mixture was combined with HDPE pellets (HDPE HYA 600; ex ExxonMobil; 60 g). The resulting mixture was extruded using an extruder (single screw extruder, ex. Barbender), to form pellets.

EXAMPLE 7

Preparation of a Chewing Gum/Filler Composition

A composition containing chewing gum and a filler was prepared as follows:

Masticated chewing gum (Wrigley's Spearmint Extra®) (11 g) was added to sunflower seed oil (40 ml) with stirring. The resulting mixture was heated for 1 hour in an autoclave to a temperature between 100 and 120° C. Thereafter the resulting mixture was allowed to cool and combined with sufficient talc (hydrated magnesium silicate) to form a mixture with a powdered consistency.

The chewing gum/talc mixture formed in this manner has been found to suitable for mixing with HDPE and forming into pellets, as set out in Example 6. Alternatively, the mixture may be fed directly to the feed hopper of a blow moulding apparatus to be combined directly with HDPE in the preparation of a finished article.

The method of this example has also been performed using water (40 ml) in place of the sunflower oil, to the same effect.

EXAMPLE 8

Preparation of a Chewing Gum/Filler Composition

A composition containing chewing gum and a filler was prepared as follows:

Masticated chewing gum (Wrigley's Spearmint Extra®) (11 g) was heated for 1 hour in an autoclave to a temperature between 100 and 120° C. Thereafter the resulting material was allowed to cool and combined with sufficient talc (hydrated magnesium silicate) to form a mixture with a powdered consistency.

The chewing gum/talc mixture formed in this manner has been found to suitable for mixing with HDPE and forming into pellets, as set out in Example 6. Alternatively, the mixture may be fed directly to the feed hopper of a blow moulding apparatus to be combined directly with HDPE in the preparation of a finished article.

EXAMPLE 9

Preparation of Plastic Article by Blow Moulding

Pellets containing chewing gum, filler and HDPE (180 g) as prepared in Example 4, colour masterbatch pellets (OM3853; 2% fuchsia pink; ex. Clariant; 40 g) and HDPE pellets (HDPE HYA 600; ex ExxonMobil; 1800 g) were mixed and added to the feed hopper of a blow moulding apparatus (ex. Latymer Engineering Company). The mixture contained chewing gum present in an amount of 10% by weight. An article was prepared from the feed mixture by blow moulding in accordance with the standard operating procedure of the apparatus. The resulting article was of high quality.

EXAMPLE 10

Preparation of Plastic Article by Blow Moulding

Pellets containing chewing gum, filler and HDPE (60 g) as prepared in Example 4, colour masterbatch pellets (OM3853; 2% fuchsia pink; ex. Clariant; 20 g) and HDPE pellets (HDPE HYA 600; ex ExxonMobil; 600 g) were mixed and added to the feed hopper of a blow moulding apparatus (ex. Latymer Engineering Company). The mixture contained chewing gum present in an amount of 10% by weight. An article was prepared from the feed mixture by blow moulding in accordance with the standard operating procedure of the apparatus. The resulting article was of high quality.

The invention claimed is:

1. A method of forming a polymer composition, the method comprising the steps of:
   (i) collecting chewed chewing gum, consisting essentially of a gum base, the gum base comprising:
      (a) a natural latex or synthetic rubber selected from the group consisting of chicle, isobutylene and butadiene rubbers and mixtures thereof; and
      (b) one or more components selected from the group consisting of resins, waxes, plasticisers, emulsifiers, fillers and antioxidants; and
   (ii) combining the chewed chewing gum with:
      (a) a polymer selected from the group consisting of polyethylene, polypropylene, polybutadiene, poly vinyl acetate, polyethylene terephthalate and mixtures thereof; and
      (b) a filler selected from the group consisting of a clay or a silica, a carbonate, a sulphate, an oxide, a hydroxide, a silicate, talc, plaster, chalk and a mixture thereof.

2. The method according to claim 1, wherein the polymer composition comprises chewed chewing gum in an amount of up to 90% by weight.

3. The method according to claim 1, wherein the polymer composition comprises filler in an amount of up to 80% by weight.

4. The method according to claim 1, further comprising:
   (iii) finely dividing the polymer composition.

5. The method according to claim 1, wherein the chewed chewing gum is first combined with the filler to form a pre-mixture; and wherein the pre-mixture is thereafter combined with the polymer.

6. The method according to claim 5 wherein the filler is combined with the chewed chewing gum with agitation.

7. The method according to claim 5, wherein the chewed chewing gum and filler are combined under the action of heat.

8. The method according to claim 5, wherein the pre-mixture and the polymer are combined by being fed to a moulding process for preparing a finished article from the composition.

9. The method according to claim 5, wherein the pre-mixture and polymer are combined in a weight ratio of pre-mixture to polymer of from 0.01 to 0.25.

10. A method of forming a polymer composition, the method comprising the steps of:
    (i) collecting chewed chewing gum consisting essentially of a gum base, the gum base comprising:
       (a) a natural latex or synthetic rubber selected from the group consisting of chicle, isobutylene and butadiene rubbers and mixtures thereof; and
       (b) one or more components selected from the group consisting of resins, waxes, plasticisers, emulsifiers, fillers and antioxidants; and
    (ii) combining the chewed chewing gum with a filler to form a pre-mixture, the filler being selected from the group consisting of a clay or a silica, a carbonate, a sulphate, an oxide, a hydroxide, a silicate, talc, plaster, chalk and a mixture thereof; and
    (iii) combining the pre-mixture thus formed with a polymer selected from the group consisting of polyethylene, polypropylene, polybutadiene, poly vinyl acetate, polyethylene terephthalate and mixtures thereof.

11. The method according to claim 10, wherein the polymer composition comprises chewed chewing gum in an amount of up to 90% by eight.

12. The method according to claim 10, wherein the polymer composition comprises filler in an amount of up to 80% by weight.

13. The method according to claim 10, further comprising:
    (iv) finely dividing the polymer composition.

14. The method according to claim 10, wherein the filler is combined with the chewed chewing gum with agitation.

15. The method according to claim 10, wherein the chewed chewing gum and filler are combined under the action of heat.

16. The method according to claim 10, wherein the pre-mixture and the polymer are combined by being fed to a moulding process for preparing a finished article from the composition.

17. The method according to claim 10, wherein the pre-mixture and polymer are combined in a weight ratio of pre-mixture to polymer of from 0.01 to 0.25.

* * * * *